United States Patent
Matsuyama (10) Patent No.: US 8,661,488 B2
(45) Date of Patent: Feb. 25, 2014

(54) NETWORK AV DEVICE AND AV NETWORK SYSTEM

(75) Inventor: Satoru Matsuyama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 926 days.

(21) Appl. No.: 12/671,357

(22) PCT Filed: Jul. 10, 2008

(86) PCT No.: PCT/JP2008/062465
§ 371 (c)(1),
(2), (4) Date: Jan. 29, 2010

(87) PCT Pub. No.: WO2009/016936
PCT Pub. Date: Feb. 5, 2009

(65) Prior Publication Data
US 2010/0263006 A1    Oct. 14, 2010

(30) Foreign Application Priority Data

Aug. 1, 2007   (JP) ................................ 2007-200609

(51) Int. Cl.
*H04N 7/173*    (2011.01)

(52) U.S. Cl.
USPC ............ 725/109; 725/110; 725/114; 725/116

(58) Field of Classification Search
USPC .................... 725/109, 110, 114, 116
See application file for complete search history.

(56) References Cited

U.S. PATENT DOCUMENTS

| 5,915,206 | A | 6/1999 | Diehl et al. |
| 7,954,131 | B2 * | 5/2011 | Cholas et al. .................. 725/112 |
| 2006/0251059 | A1 | 11/2006 | Otsu et al. |
| 2006/0256241 | A1 | 11/2006 | Suzuki et al. |
| 2008/0134237 | A1 * | 6/2008 | Tu et al. ........................... 725/38 |
| 2011/0271296 | A1 * | 11/2011 | Tu et al. ........................... 725/25 |

FOREIGN PATENT DOCUMENTS

| CN | 1836441 A | 9/2006 |
| CN | 1972201 A | 5/2007 |
| JP | 8-237276 A | 9/1996 |
| JP | 2002-185874 A | 6/2002 |
| JP | 2005-51547 A | 2/2005 |
| JP | 2006-345479 A | 12/2006 |
| JP | 2007-180697 A | 7/2007 |
| WO | WO-2005/015901 A1 | 2/2005 |

* cited by examiner

*Primary Examiner* — Kieu Oanh T Bui
(74) *Attorney, Agent, or Firm* — Birch, Stewart, Kolasch & Birch, LLP (57) ABSTRACT

In an AV network system where one or more servers and digital TVs are connected to a network, and a server connected to the network is also connected to a digital TV by a HDMI cable, the digital TV searches for the one or more servers and obtains an IP address of each of the servers via the network. Further, the digital TV requests an IP address of the servers using HDMI CEC and obtains the IP address from the recorder connected to the digital TV by the HDMI cable. The digital TV compares the IP address obtained using CEC with the IP address obtained via the network, and receives video and audio signals from the server via the HDMI cable when the IP addresses match.

25 Claims, 7 Drawing Sheets

NETWORK AV DEVICE AND AV NETWORK SYSTEM

BACKGROUND OF THE INVENTION

1. Field of the Invention

The present invention relates to an AV (Audio-Visual) device, and in particular to a network AV device connected to a network. Further, the present invention relates to an AV network system including a plurality of network AV devices mutually connected.

2. Description of the Related Art

At present, AV devices such as a digital television (TV) on which digital broadcasting can be viewed and an HDD (Hard Disk Drive) recorder capable of saving broadcast contents in a built-in HDD have been in widespread use. Further, such AV devices have recently become capable of being connected with the Internet, a personal computer, and the like through a network utilizing the IP protocol.

Furthermore, a mechanism for mutually connecting an AV device, a personal computer, and the like via such a network to allow contents saved in various devices to be viewed at any location at home has been proposed by the DLNA (Digital Living Network Alliance).

In a case where DLNA-compliant devices are in widespread use and the number of devices mutually connected via the network is increased, if a user selects a device to view a content, devices other than the device in front of the user are also detected. In addition, since network identification information such as an IP address, a MAC address, a host name, and the like is the only information available to identify a device, it is difficult for the user to identify a device saving the content from among a plurality of devices.

As a method to solve the problem, the following has been proposed. Patent Document 1 (Japanese Patent Laying-Open No. 2006-345479) discloses a method of identifying a device in front of a user by a device body making a response using video output from a display device, blinking of light from an LED, audio output from a speaker, or the like of the device body identified actually.

Patent Document 1: Japanese Patent Laying-Open No. 2006-345479

SUMMARY OF THE INVENTION

Problems to be Solved by the Invention

In the method described in Patent Document 1, it is possible to identify a device saving a content, but it is unknown how the device is connected with another device. Therefore, in such a case where an HDD recorder as a device saving contents and a digital TV as a device displaying contents are connected by a cable for transmitting video and audio signals, for example, a cable compliant with HDMI (High-Definition Multimedia Interface), there arises a problem as described below.

Specifically, to transmit video and audio signals with as less load being applied to a network as possible and to allow a user to view a more beautiful video stably on a digital TV, it is desirable to transmit the video and audio signals by an HDMI cable, not through the network. However, since the method described in Patent Document 1 cannot identify how the digital TV and the HDD recorder are connected, data is transmitted using a network.

Further, although the method described in Patent Document 1 can identify that the device saving the content is in front of the user, if the user desires to view a content saved in a list of contents, the user has to switch input of the digital TV, and hold a remote controller for a device saving the content.

The present invention has been made to solve the problems as described above, and one object of the present invention is to provide a device capable of identifying which device on a network is connected by a cable.

Another object of the present invention is to provide a device capable of automatically selecting an output destination for video and audio in a device saving a selected content and an input source for a device on which the content is viewed, in outputting the selected content.

Means for Solving the Problems

The present invention in accordance with an aspect is a network AV device connected with a plurality of external devices by a network, and connected with an external device of the plurality of external devices by a cable, including: a first detection unit detecting first identification information from the plurality of external devices via the network; a second detection unit detecting second identification information from the external device via the cable; and a determination unit comparing the first identification information detected by the first detection unit with the second identification information detected by the second detection unit, and identifying the external device connected with the network AV device by the cable from among the plurality of external devices.

Preferably, if the first identification information matches the second identification information, the network AV device determines that the external device corresponding to the matching second identification information is connected with the network AV device by the cable, and outputs a content to the external device through the cable.

Preferably, if the first identification information does not match the second identification information, the network AV device determines that the external device corresponding to the matching second identification information is not connected with the network AV device by the cable, and outputs a content to the external device through the network.

Preferably, the network AV device further includes: an input unit receiving an instruction from a user; a selection unit selecting one external device from the plurality of external devices in response to the instruction to the input unit; and an instruction unit causing the selected external device to transmit a content via the cable if the external device selected by the selection unit is the external device determined by the determination unit as being connected with the network AV device by the cable.

More preferably, the network AV device further includes: a cable reception unit receiving the content transmitted by the selected external device via the cable; and a network reception unit receiving a content transmitted by the selected external device via the network, wherein, if the selected external device is the external device determined by the determination unit as being connected with the network AV device by the cable, the network AV device selects the cable reception unit to receive the content.

Preferably, the second detection unit detects the second identification information in response to selection of the external device by the selection unit.

Preferably, the network AV device further includes: an input unit receiving an instruction from a user; a selection unit selecting one external device from the plurality of external devices in response to the instruction to the input unit; and an instruction unit causing the selected external device to transmit a content via the network if the external device selected by the selection unit is the external device determined by the determination unit as not being connected with the network AV device by the cable.

More preferably, the network AV device further includes a decoder decoding the content received via the network.

Preferably, the network AV device further includes: a storage unit storing contents; a request reception unit receiving a content request from the external device; and a transmission unit transmitting a content corresponding to the content request to the external device that has transmitted the content request via the cable if the external device that has transmitted the content request is the external device determined by the determination unit as being connected with the network AV device by the cable.

More preferably, if the external device that has transmitted the content request is the external device determined by the determination unit as being connected with the network AV device by the cable, the transmission unit further transmits an instruction to receive the content via the cable and reproduce the received content, to the external device that has transmitted the content request.

More preferably, the second detection unit detects the second identification information in response to reception of the content request by the request reception unit.

Preferably, the network AV device further includes: a storage unit storing contents; a request reception unit receiving a content request from the external device; and a transmission unit transmitting a content corresponding to the content request to the external device that has transmitted the content request via the network if the external device that has transmitted the content request is the external device determined by said determination unit as not being connected with the network AV device by the cable.

More preferably, the transmission unit further transmits an instruction to decode the content to the external device that has transmitted the content request.

Preferably, in response to activation of the external device, the first detection unit detects the first identification information of the activated external device.

Preferably, the second detection unit senses plugging or unplugging of the cable into or from the external device, and detects the second identification information in response to sensing of plugging or unplugging of the cable.

Preferably, the cable is an HDMI cable.

More preferably, a control signal for the cable is a CEC signal.

More preferably, a control signal for the cable is an EDID signal.

More preferably, a control signal for the cable is a DDC signal.

Preferably, the first network identification information and the second network identification information are IP addresses.

Preferably, the first network identification information and the second network identification information are MAC addresses.

Preferably, the first network identification information and the second network identification information are host names.

The present invention in accordance with another aspect is an AV network system including a plurality of the network AV devices described above.

Effects of the Invention

According to the present invention, the network device compares identification information of an external device obtained via a network with identification information of an external device obtained via a cable. As a result, the network device can determine whether the external device connected by the network is also connected by the cable.

DESCRIPTION OF THE REFERENCE NUMERALS

1: digital TV, 2: first recorder, 20: second recorder, 3: remote controller for digital TV 1, 30: remote controller for the first recorder 2, 4: HDMI cable, 5: AV network, 6: Internet, 7: broadband router, 11: CPU in digital TV 1, 12: remote controller reception unit in digital TV 1, 13: internal bus in digital TV 1, 14: memory in digital TV 1, 15: network interface in digital TV 1, 16: decoder in digital TV 1, 17: display controller, 18: display, 19: external input unit, 21: CPU in the first recorder 2, 22: remote controller reception unit in the first recorder 2, 23: internal bus in the first recorder 2, 24: memory in the first recorder 2, 25: network interface in the first recorder 2, 26: decoder in the first recorder 2, 27: recording control unit, 28: recording medium, 29: external output unit, 40: HDMI connector, 41: signal conversion unit, 42: signal restoring unit.

DETAILED DESCRIPTION OF THE INVENTION

Hereinafter, embodiments of the present invention will be described in detail with reference to the drawings, in which identical or corresponding parts will be designated by the same reference signs.

[Embodiment 1]

Hereinafter, a network AV device of Embodiment 1 of the present invention will be described.

(1-1 Configuration of AV Network System)

Figure 1:
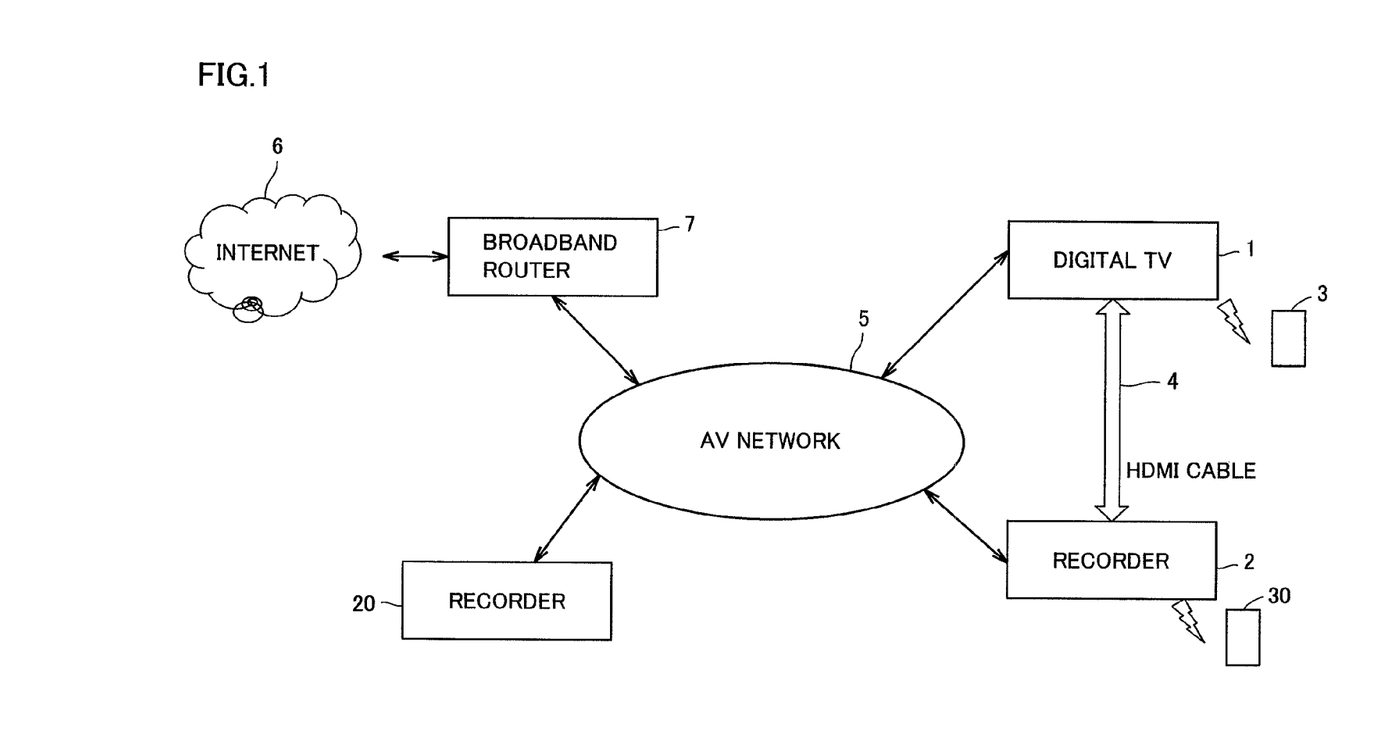
FIG. 1 is a view showing an exemplary configuration of an AV network system including network AV devices of Embodiment 1 of the present invention.

FIG. 1 is a view showing an exemplary configuration of an AV network system including network AV devices of Embodiment 1 of the present invention. FIG. 1 shows a digital TV 1, a first recorder 2, and a second recorder 20 as exemplary network AV devices. Digital TV 1 and the first recorder 2 are operated with a remote controller 3 and a remote controller 30, respectively. Although not shown, there is a remote controller for operating the second recorder 20. An HDMI cable 4 connects digital TV 1 and recorder 2. An AV network 5 and the Internet 6 are connected by a broadband router 7.

Digital TV 1 is an exemplary network AV device. Digital TV 1 includes, for example, a cathode ray tube (CRT), a liquid crystal display (LCD), a plasma display panel (PDP), and the like. Digital TV 1 can receive contents in the first recorder 2 and the second recorder 20 connected by AV network 5 through the network, and reproduce the contents. Further, digital TV 1 can receive a content reproduced by the first recorder 2 through HDMI cable 4, and allow a user to view the content. In the present embodiment, a content refers to information including a video signal, an audio signal, or both.

The first recorder 2 and the second recorder 20 are each exemplary network AV devices. The first recorder 2 and the second recorder 20 are, for example, recording/reproduction devices such as a DVD (Digital Versatile Disc) recorder, an HDD recorder, a BD (Blu-ray Disc) recorder, a home server, a personal computer, and the like. The first recorder 2 and the second recorder 20 have a function of recording a broadcast program content provided by digital broadcasting or analog broadcasting, and video or music information taken with a digital camera, a digital video camera, or the like, in a built-in HDD, a DVD, or the like. The first recorder 2 and the second recorder 20 also have a function of reproducing a content in a recording medium such as an HDD, a DVD, or the like. Further, the first recorder 2 and the second recorder 20 have a function of allowing a list of contents saved as digital data to be viewed from another device through the network, and transferring a selected content to a display device such as digital TV 1.

HDMI cable 4 is a cable connecting the first recorder 2 and digital TV 1, and can transfer digital video signal and audio signal reproduced by the first recorder 2 with a single cable. The devices connected by HDMI cable 4 can control each other using a CEC (Consumer Electronics Control) signal.

AV network 5 is a network that can be constructed in an ordinary household. AV network 5 connects digital TV 1, the first recorder 2, the second recorder 20, broadband router 7, and other devices such as a personal computer not shown, by Ethernet (registered trademark), a wireless LAN (Local Area Network), Power Line Communications (PLC), or the like. The devices connected by AV network 5 can communicate with one another using IP (Internet Protocol). For interconnection among network AV devices via a network, the DLNA has established an industry standard. Digital TV 1, the first recorder 2, and the second recorder 20 are configured to allow interconnection compliant with the DLNA.

The Internet 6 is an exemplary external network. Broadband router 7 is provided for allowing a device connected to a home network to access the Internet 6. Broadband router 7 has a function of obtaining a global IP address for accessing the Internet 6 from a service provider, and converting the global IP address into a private IP address at home and vice versa. Broadband router 7 also has a function as a DHCP (Dynamic Host Configuration Protocol) server, and can assign an IP address to each device connected to a home network when the device is set to automatically obtain an IP address.

(1-2 Exemplary Internal Configuration of Network AV Device)

Figure 2:
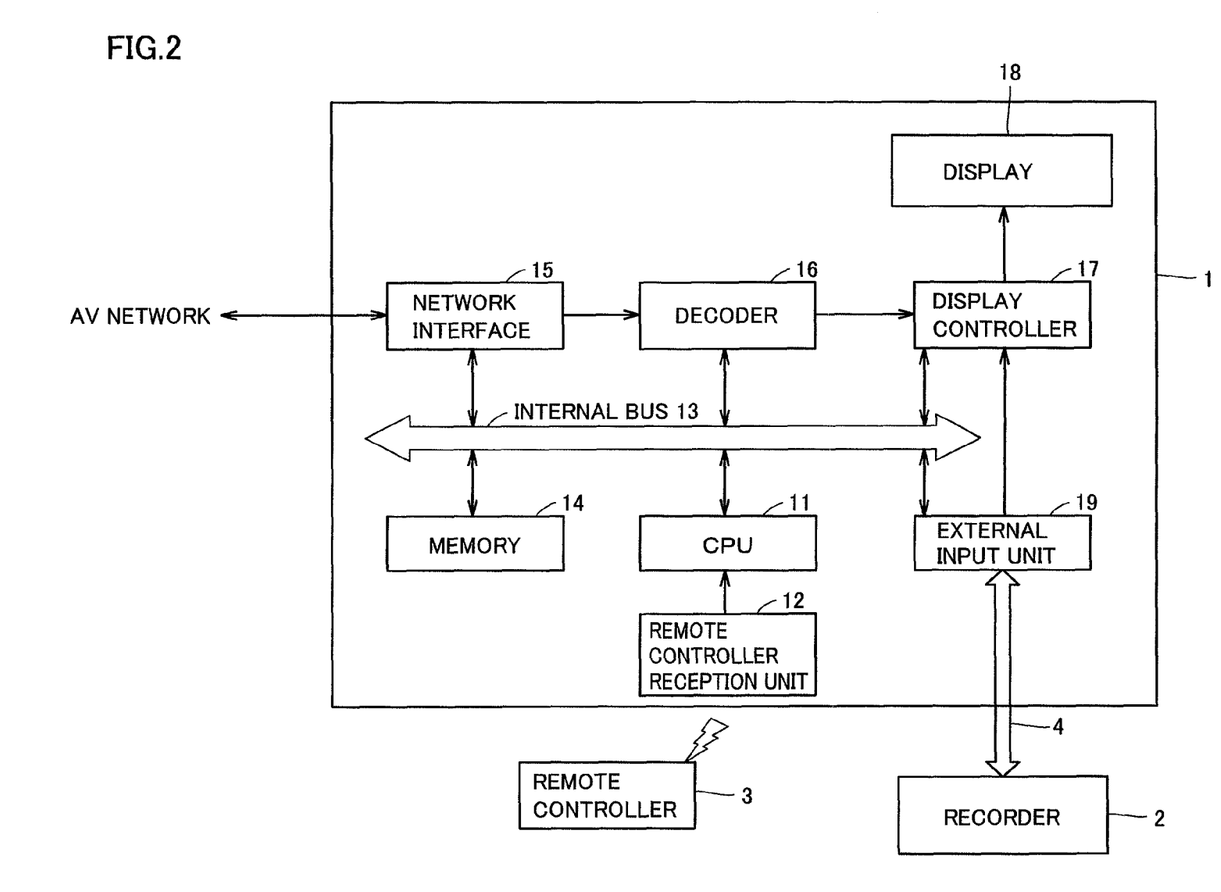
FIG. 2 is a view showing an exemplary internal configuration of a digital TV 1.

FIG. 2 is a view showing an exemplary internal configuration of digital TV 1 shown in FIG. 1.

A CPU 11 in digital TV 1 controls an entire operation of digital TV 1 based on a signal from remote controller 3. A remote controller reception unit 12 is connected to CPU 11, and remote controller reception unit 12 sends an instruction to CPU 11 based on the signal from remote controller 3. For example, in a case where remote controller 3 performs infrared communication, remote controller reception unit 12 converts an infrared signal from remote controller 3 into a command, and sends the command to CPU 11. After receiving the command, CPU 11 performs a prescribed operation based on a program stored in a memory 14 connected through an internal bus 13.

A network interface 15 is a device communicating with another device connected to the network by, for example, Ethernet (registered trademark) or the like. Network interface 15 can receive a list of contents, compressed stream data, and the like owned by another device connected to the network.

When network interface 15 receives stream data, the stream data is transferred to a decoder 16 directly or through internal bus 13. Decoder 16 expands the received stream data to digital video signal and audio signal.

As for the video signal, decoder 16 transfers the video signal to a display controller 17. Display controller 17 converts the video signal into a format corresponding to a display 18, combines the converted video signal with a user interface picture plane produced by CPU 11 or the like, and transfers the video signal to display 18. As for the audio signal, decoder 16 outputs the audio signal to a speaker through a DA converter and an amplifier not shown.

Further, display controller 17 can also receive a video signal input from the first recorder 2 to an external input unit 19 through HDMI cable 4, and transfer the video signal to display 18.

Figure 3:
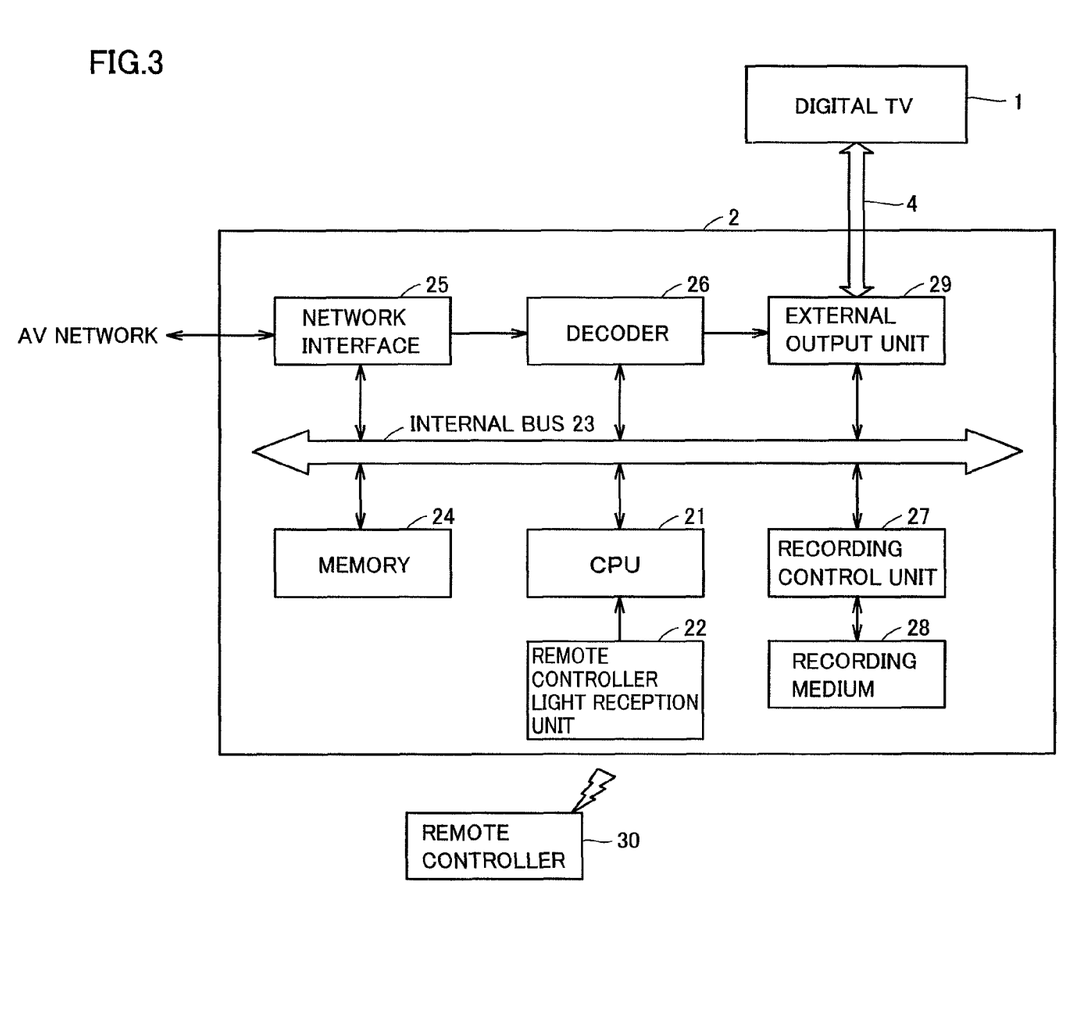
FIG. 3 is a block diagram showing an exemplary internal configuration of a first recorder 120.

FIG. 3 is a block diagram showing an exemplary internal configuration of the first recorder 2 shown in FIG. 1. As with CPU 11 in digital TV 1, a CPU 21 in the first recorder 2 receives a signal from remote controller 30 through a remote controller reception unit 22, and performs a prescribed operation based on a program stored in a memory 24. The operation of a network interface 25 is the same as the operation of network interface 15 in digital TV 1.

The first recorder 2 is different from digital TV 1 in that the first recorder 2 includes a recording control unit 27 and a recording medium 28. Examples of recording medium 28 include an HDD, a DVD, a BD, and the like. Recording control unit 27 causes recording medium 28 to save contents such as video and images, or stream data received from a tuner not shown, in response to an instruction from CPU 21. Recording control unit 27 also reads data from recording medium 28 in response to an instruction from CPU 21.

To reproduce the stream data saved in recording medium 28, recording control unit 27 reads the saved stream data from recording medium 28, and transfers the stream data to a decoder 26 directly or via an internal bus 23.

Decoder 26 expands the received stream data to digital video signal and audio signal, and transfers the respective signals to an external output unit 29. External output unit 29 converts a signal obtained for example by combining the video signal with a user interface picture plane produced by CPU 21 or the like into an HDMI signal, and outputs the HDMI signal to digital TV 1 via HDMI cable 4.

Further, the first recorder 2 can also transfer the stream data saved in recording medium 28 to another device connected to AV network 5, via network interface 25, upon a request from the other device.

It is to be noted that the second recorder 20 has the same internal configuration as that of the first recorder 2.

(1-3 Configuration of Cable Connection Unit)

Figure 4:
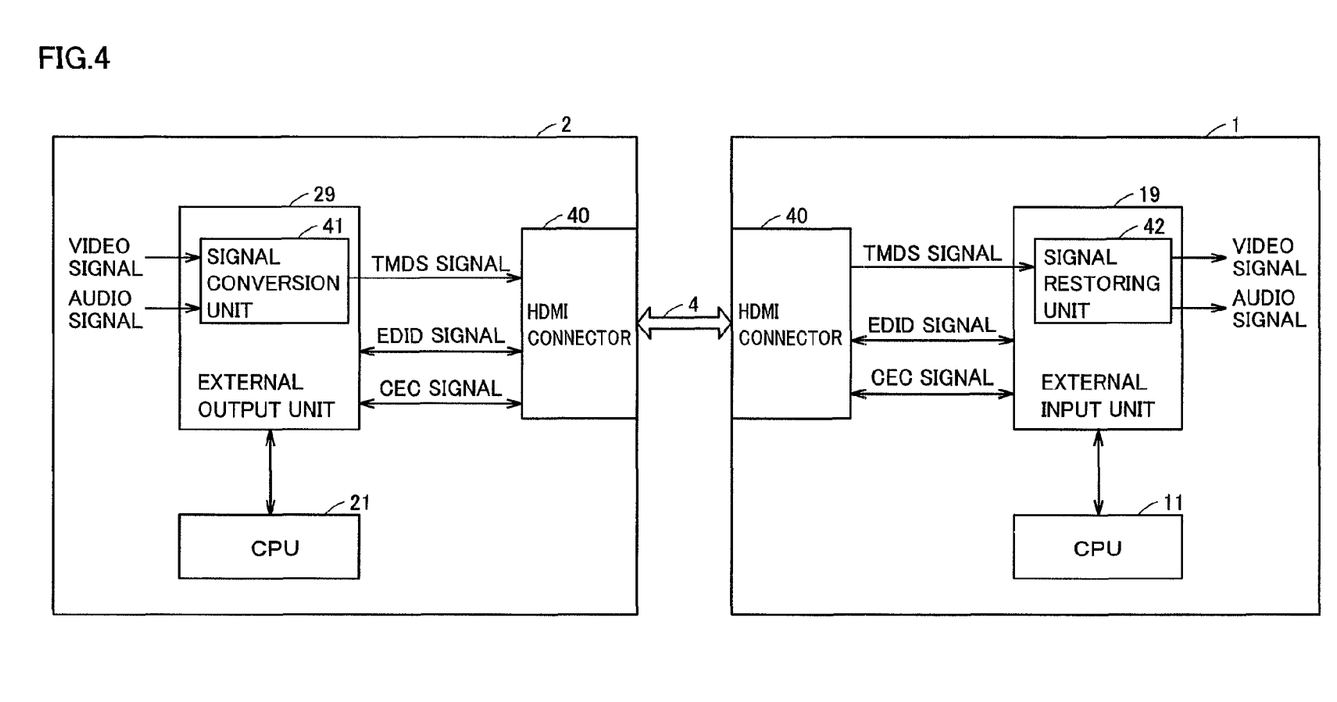
FIG. 4 is a block diagram showing a configuration of an input unit and an output unit to which an HDMI cable 4 is connected.

FIG. 4 is a block diagram showing a configuration of the input unit and the output unit to which HDMI cable 4 is connected in a case where digital TV 1 and the first recorder 2 shown in FIG. 1 are connected by HDMI cable 4. In FIG. 4, HDMI cable 4 connects digital TV 1 and the first recorder 2 using HDMI connectors 40.

In this connection example, a video signal and an audio signal reproduced in the first recorder 2 as an output side are converted into four pairs of differential signals called TMDS (Transition Minimized Differential Signaling) at a signal conversion unit 41 in external output unit 29. The converted video signal and audio signal are transferred to external input unit 19 in digital TV 1 as an input side, through HDMI cable 4.

The input TMDS signal is restored to the original video signal and audio signal at a signal restoring unit 42 in external input unit 19. The restored video is shown on the display, and the restored audio is output from the speaker.

In addition to the TMDS signal, HDMI cable 4 transmits a CEC signal for mutual control of consumer electronics, an EDID (Extended Display Identification Data) signal or a DDC (Display Data Channel) signal for mutual authentication of connected devices, and the like. These signals can be controlled by CPU 11 and CPU 21.

An HDMI CEC signal in the present embodiment will now be described. The CEC signal is a 1-bit serial signal for mutual control of consumer electronics. The HDMI specifications include predetermined control codes for general-purpose commands that can be used by venders in common, such as power supply manipulation and input switching, and also include control codes for exchanging data specific to each vendor.

(1-4 Operations of Devices)

Figure 5:
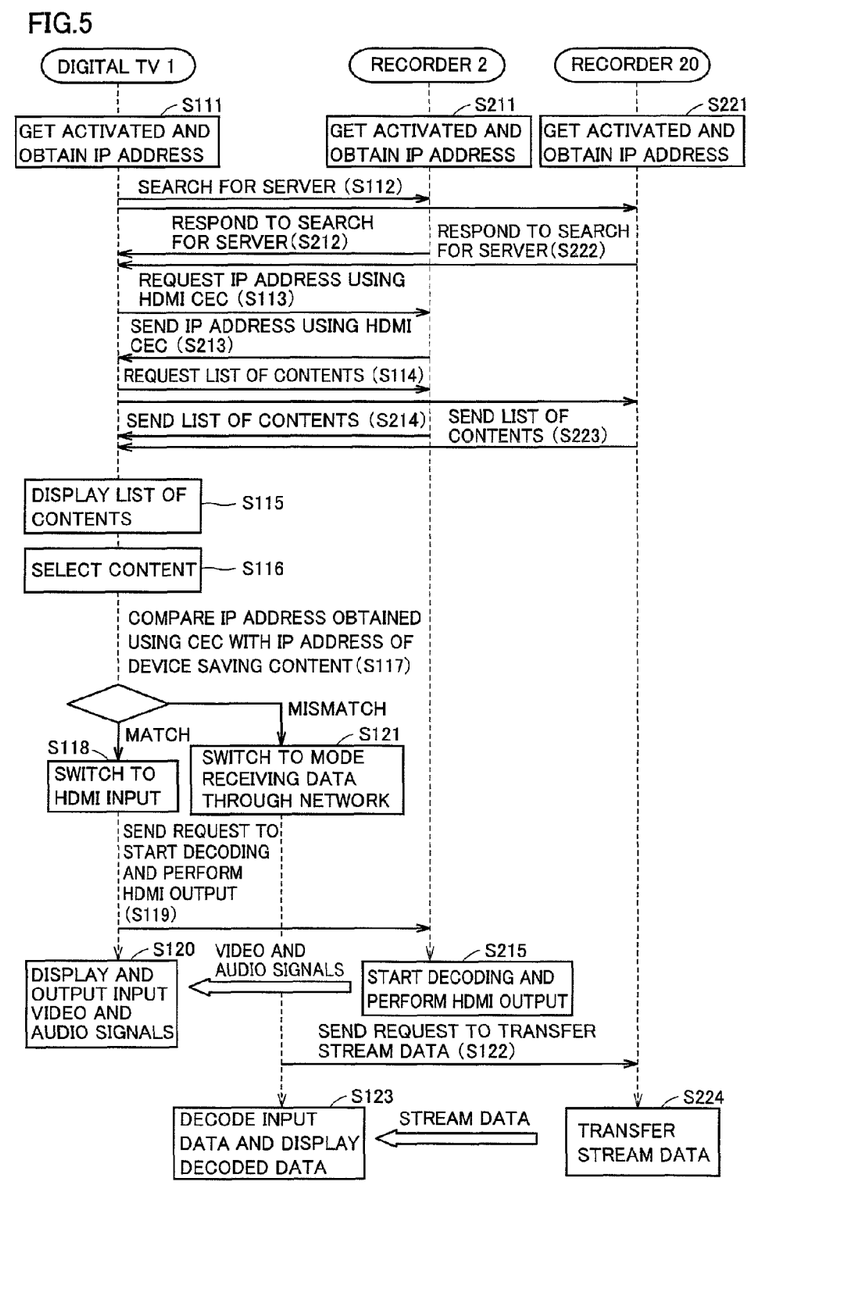
FIG. 5 is a sequence diagram showing operations of digital TV 1, a recorder 2, and a recorder 20.

FIG. 5 is a sequence diagram showing operations of digital TV 1, the first recorder 2, and the second recorder 20 in the case of displaying a list of contents saved in the first recorder 2 and the second recorder 20 connected to the network on a screen of digital TV 1 shown in FIG. 1, and causing digital TV 1 to output a content saved in the first recorder 2 or the second recorder 20.

Digital TV 1, the first recorder 2, and the second recorder 20 are each activated in response to an instruction by a user, and obtain an IP address from broadband router 7 having a function as a DHCP server (step S111, step S211, step S221). However, the IP address is an example of identification information for identifying each device, and may be a MAC address, a host name, or the like. The IP address obtained by each device may be different every time when the device is activated, unless making a setting such as registering a MAC address of each device in the DHCP server. The obtained IP address is stored in the memory of each device.

In step S112, digital TV 1 searches for a content server connected to AV network 5. A content server refers to a device saving contents among the devices connected to AV network 5. Since recorder 2 and recorder 20 function as content servers in the present embodiment, recorder 2 and recorder 20 send a response in step S212 and step S222, respectively. Based on the details of the responses, digital TV 1 can detect information such as the names and the IP addresses, MAC addresses, or host names of recorder 2, recorder 20, and other devices connected to the network, and can detect whether these devices have functions such as providing a list of contents via the network, transferring a selected content, and the like. At this stage, however, digital TV 1 cannot recognize which device actually has which IP address.

Herein, the first recorder 2 and the second recorder 20 are configured to send a response to a search for a server. However, the first recorder 2 and the second recorder 20 may be configured to broadcast a response to the network without waiting for a periodical search for a server.

Further, when the content server is detected, in step S113, digital TV 1 requests a device connected by HDMI to send an IP address of the connected device, using an HDMI CEC signal. Again, the IP address is an example of identification information for identifying each device, and may be a MAC address, a host name, or the like. Further, digital TV 1 may obtain identification information using an EDID signal or a DDC signal, instead of an HDMI CEC signal. Since the first recorder 2 is the device connected to digital TV 1 by HDMI in FIG. 1, in step S213, the first recorder 2 sends the IP address obtained in step S211 as a response, using an HDMI CEC signal. Based on the details of the response, digital TV 1 detects the IP address of the first recorder 2. It is to be noted that, in the present embodiment, digital TV 1 and the first recorder 2 each use a control code which is a CEC signal specific to each vender to request an IP address and send the IP address.

When a user desires to view a content saved in recorder 2 or recorder 20 on digital TV 1, the user manipulates remote controller 3. In accordance with the manipulation, digital TV 1 requests the servers responding to the search for a server performed in step S112 to send a list of contents (step S114). Recorder 2 and recorder 20 receive the request for a list of contents, and send a list of contents in step S214 and step S223, respectively. Based on the lists of contents received, digital TV 1 displays on display 18 a list of contents that can be viewed on digital TV 1 (step S115).

Next, in step S116, digital TV 1 selects a content to be viewed on digital TV 1 from the list of contents in accordance with the manipulation of remote controller 3 by the user.

Then, in step S117, digital TV 1 compares an IP address of a server saving the content selected in step S116 with the IP address of the device connected by HDMI obtained using the HDMI CEC signal.

If the IP address of the device connected by HDMI matches the IP address of the server saving the selected content, in step S118, digital TV 1 switches input of digital TV 1 to HDMI input. Further, in step S119, digital TV 1 instructs the first recorder 2 to start decoding of the selected content and perform HDMI output, using an HDMI CEC signal or a signal through the network. Upon receiving a request to start decoding, the first recorder 2 sequentially reads stream data of the selected content from recording medium 28 in step S215. Further, the first recorder 2 decodes the read stream data at decoder 26, and outputs the decoded video signal and audio signal through HDMI. In step S120, digital TV 1 displays the input video signal on the display, and outputs the input audio signal to the speaker.

In a case where there are two or more devices connected by HDMI, digital TV 1 requests each of the devices to send an IP address, using a CEC signal. Then, in step S118, digital TV 1 switches to HDMI input to which a device having an IP address that matches that of the server saving a selected content is connected.

On the other hand, if digital TV 1 selects in step S116 a content saved in the second recorder 20, in step S117, the IP address obtained using HDMI CEC does not match that of recorder 20. Therefore, in step S121, digital TV 1 switches to a mode receiving stream data of the content through the network. In step S122, digital TV 1 requests the second recorder 20 saving the content to transfer stream data of the selected content. Upon receiving a request to transfer stream data, the second recorder 20 reads stream data of the selected content from recording medium 21 in step 5224. Further, the second recorder 20 transfers the stream data from network interface 15 to digital TV 1 through the network. Digital TV 1 decodes the received stream data, displays the decoded video signal on the display, and outputs the decoded audio signal to the speaker.

In the present embodiment, digital TV 1 requests an IP address of a device connected to HDMI after a server is detected and before requesting a list of contents. However, digital TV 1 may request the IP address after requesting a list of contents in step S114, after selecting a content in step S115, or after plugging or unplugging of an HDMI cable is detected.

Further, in the present embodiment, digital TV 1 determines whether another device is connected with digital TV 1 by a cable after the user selects a content, only for the device saving the selected content. However, digital TV 1 may perform such determination without an instruction by the user.

As described above, by comparing an IP address obtained using an HDMI CEC signal with an IP address of a server on a network saving a content, digital TV 1 can cause a connected device to output a content desired to be viewed preferentially through HDMI if the connected device can output the content through HDMI, without special manipulation by the user. If the content desired to be viewed is a high-definition content compressed by MPEG2, network transfer capability of a bit rate of about 20 Mbps is required. Therefore, if stream data is transferred through the network, load is applied on the entire network. In addition, due to insufficient transfer capability, packet loss or delay occurs in the stream data to be transferred, and there is a possibility that noise occurs in eventually reproduced video and audio. Consequently, it is preferable to give priority to HDMI capable of transferring reliable and high quality video signal and audio signal, rather than transferring stream data through the network.

[Embodiment 2]

Hereinafter, a network AV device of Embodiment 2 of the present invention will be described.

Figure 6:
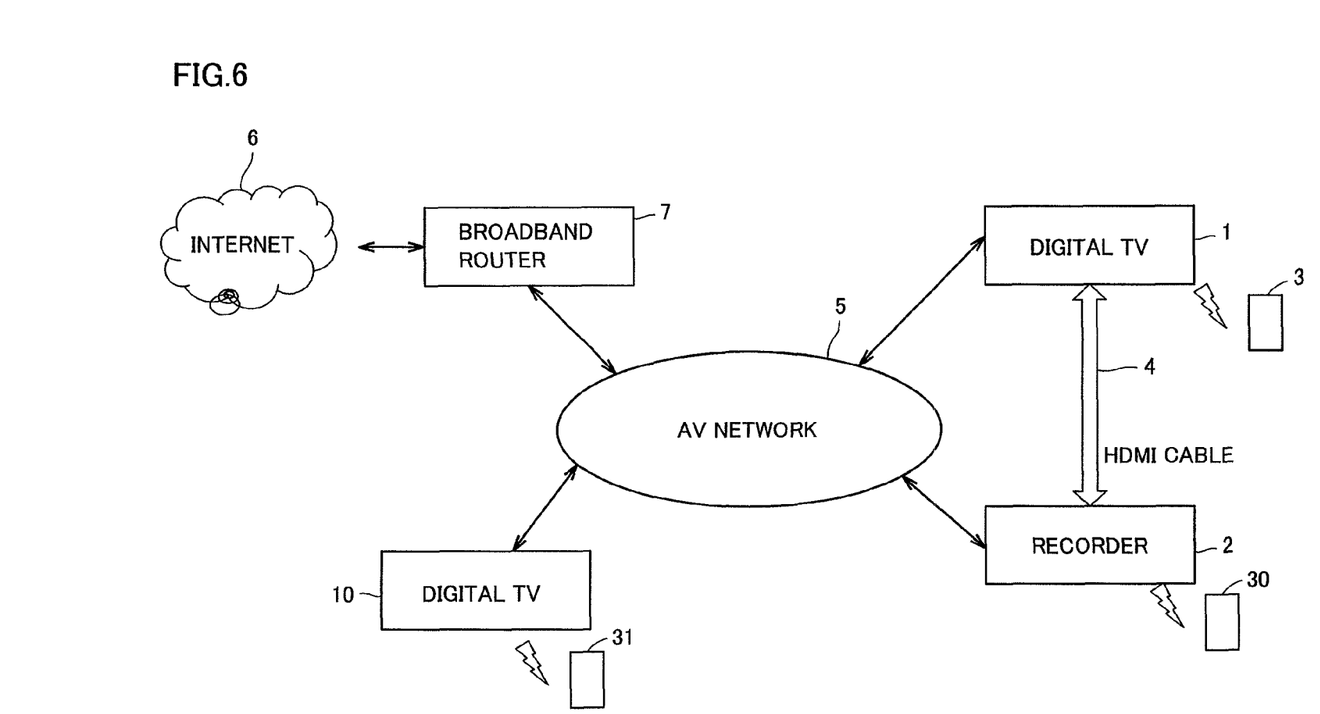
FIG. 6 is a view showing an exemplary configuration of an AV network system including network AV devices of Embodiment 2 of the present invention.

FIG. 6 is a view showing an exemplary configuration of an AV network system including network AV devices of Embodiment 2 of the present invention. Although the AV network system of FIG. 6 is substantially identical to the AV network system of Embodiment 1, it is different in that it includes a digital TV 10 in addition to digital TV 1. Digital TV 10 has functions substantially identical to those of digital TV 1. Further, a remote controller 31 for manipulating digital TV 10 is also substantially identical to remote controller 3.

Recorder 2 is connected to digital TV 1 by HDMI cable 4. On the other hand, recorder 2 is not connected to digital TV 10. Since the internal configuration of digital TV 10 is substantially identical to that of digital TV 1, description for digital TV 10 will not be repeated. Further, it is assumed that digital TV 1 and digital TV 10 are placed in different rooms.

Figure 7:
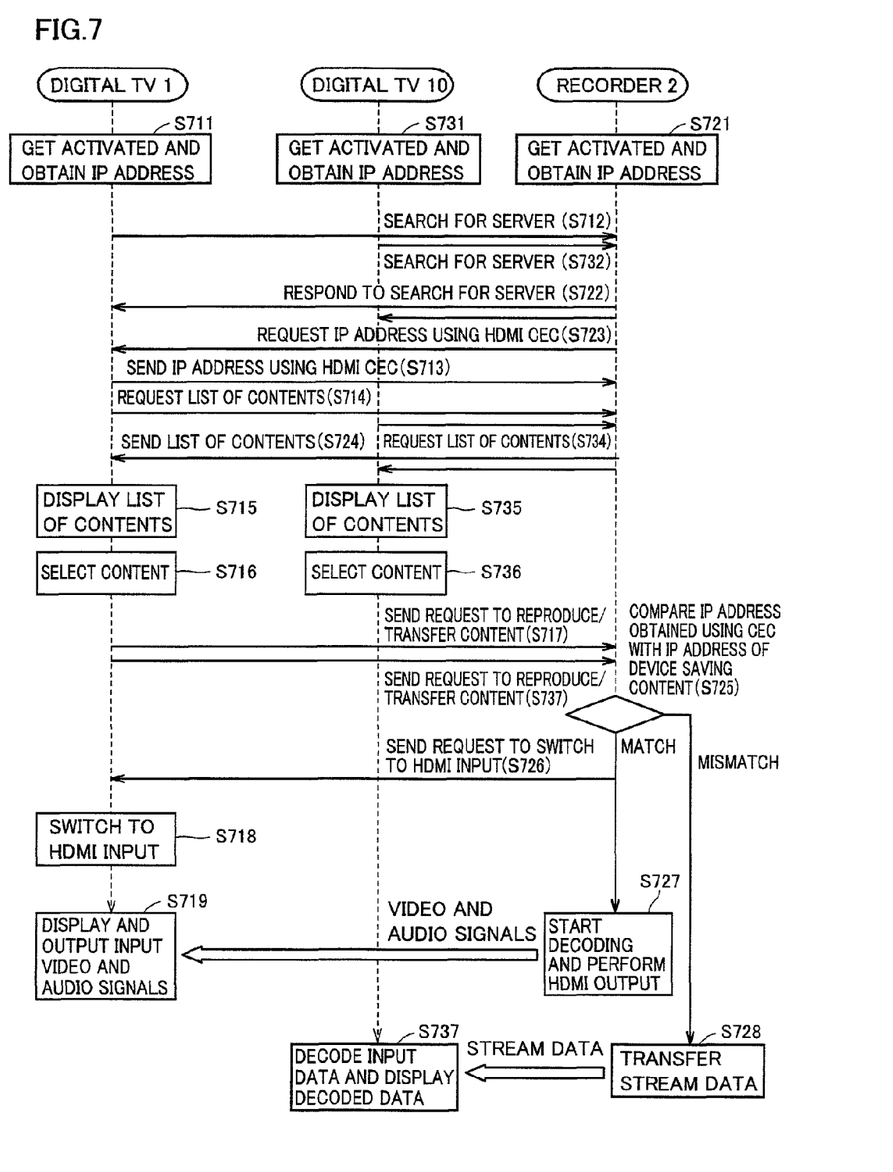
FIG. 7 is a sequence diagram showing operations of digital TV 1, a digital TV 10, and recorder 2.

FIG. 7 is a sequence diagram showing operations of digital TV 1, digital TV 10, and the first recorder 2 in the case of displaying a list of contents of the first recorder 2 connected to the network on a screen of digital TV 1 or digital TV 10 shown in FIG. 6, and allowing a user to view a selected content on digital TV 1 connected to the first recorder 2 by HDMI cable 4 or digital TV 10 not connected to the first recorder 2 by the HDMI cable. Although FIG. 7 describes as if viewing on digital TV 1 and viewing on digital TV 10 occur simultaneously for convenience sake, the two types of viewing do not necessarily occur simultaneously.

As in Embodiment 1, digital TV 1, the first recorder 2, and digital TV 10 are each activated and obtain an IP address from the DHCP server in step S711, step S731, and step S721, respectively. However, as in Embodiment 1, the IP address is an example of identification information for identifying each device, and may be a MAC address, a host name, or the like. The obtained IP address is stored in the memory of each device.

Further, as in Embodiment 1, digital TV 1 and digital TV 10 search for a server connected to the AV network in step S712 and step S732, respectively. Since recorder 2 functions as a content server in the present embodiment, the first recorder 2 sends a response in step S722. Herein, as in Embodiment 1, the first recorder 2 may be configured to broadcast a response to the network without waiting for a periodical search for a server.

Next, in step S723, the first recorder 2 requests a device connected to the first recorder 2 by HDMI to send an IP address of the connected device, using an HDMI CEC signal. Again, the IP address is an example of identification information for identifying each device, and may be a MAC address, a host name, or the like. Further, the first recorder 2 may obtain identification information using an EDID signal or a DDC signal, instead of an HDMI CEC signal. Since digital TV 1 is the device connected to the first recorder 2 by HDMI in FIG. 7, in step S713, digital TV 1 sends the IP address obtained in step S711 as a response, using an HDMI CEC signal.

The user manipulating digital TV 1 or digital TV 10 manipulates a remote controller when the user desires to view a content saved in the first recorder 2. In accordance with the manipulation of the remote controller, in step S714, digital TV 1 requests the server searched in step S712 to send a list of contents. The first recorder 2 receives the request for a list of contents, and sends a list of contents in step S724 Digital TV 1 and digital TV 10 each display a list of contents that can be viewed on the screen in step S715 and step S735, respectively.

Next, digital TV 1 and digital TV 10 each select a content to be viewed on digital TV 1 and digital TV 10 from the list of contents in accordance with the manipulation of the remote controller by the user in step S716 and step S736, respectively. Then, in accordance with the selected content, digital TV 1 and digital TV 10 transmit a request to reproduce/transfer the content to recorder 2 saving the content (step S717, step S737).

Upon receiving the request to reproduce/transfer the content, the first recorder 2 compares an IP address of a device that has transmitted the request with the IP address of the device connected by HDMI obtained using the HDMI CEC signal, in step S725. If they match, the first recorder 2 transmits a request to digital TV 1 to switch input to HDMI input to which the first recorder 2 is connected, using an HDMI CEC signal or through the network, in step S726. Upon receiving the request to switch input, digital TV 1 switches input to HDMI input to which the first recorder 2 is connected, in step S718.

Subsequently, the first recorder 2 sequentially reads stream data of the selected content from recording medium 21 in step S727. Further, the first recorder 2 decodes the stream data at decoder 16, and outputs the decoded video signal and audio signal through HDMI. In step S719, digital TV 1 displays the input video signal on the display, and outputs the input audio signal to the speaker.

On the other hand, if the first recorder 2 receives the request to reproduce/transfer the content from digital TV 10, the first recorder 2 determines in step S725 that an IP address of a device that has transmitted the request does not match the IP address of the device connected by HDMI obtained using the HDMI CEC signal. Therefore, the first recorder 2 reads stream data of the selected content from recording medium 21 in step S728. Further, the first recorder 2 transfers the stream data from network interface 15 to digital TV 10 through the network. Digital TV 10 decodes the received stream data in step S737. Further, digital TV 10 displays the decoded video signal on the display, and outputs the decoded audio signal to the speaker.

In the present embodiment, the first recorder 2 requests an IP address of a device connected to HDMI (step S723) after sending a response for the search in step S722 and before a request for a list of contents (step S714, step S734). However, the first recorder 2 may request the IP address at another timing. For example, recorder 2 may request the IP address after receiving a request for a list of contents in step S724, after receiving a request to reproduce/transfer the content in step S717 and step S737, or after insertion of an HDMI cable is detected.

Further, in the present embodiment, the first recorder 2 determines, in accordance with a request to reproduce/transfer the content by the user, whether it is connected with a device requesting the content by a cable, and receives the content via the network or the cable in accordance with the result of the determination. However, the first recorder 2 may determine whether it is connected with another device by a cable without an instruction by the user. If the first recorder 2 determines that it is connected with another device by a cable, the first recorder 2 transmits the content to the device via the cable. If the first recorder 2 determines that it is not connected with another device by a cable, the first recorder 2 transmits the content to the device via the network.

As described above, by comparing an IP address obtained using an HDMI CEC signal with an IP address of a device that has transmitted a request to reproduce/transfer a content, the first recorder 2 can output a content desired to be viewed preferentially through HDMI if it can output the content through HDMI, without special manipulation by the user.

The invention claimed is:

1. A network AV device connected with all of a plurality of external devices by a network, and connected with an external device among said plurality of external devices by a cable other than said network, comprising:
    a first detection unit detecting first identification information owned by said plurality of external devices via said network;
    a second detection unit detecting second identification information from said external device via said cable; and
    a determination unit comparing the first identification information detected by said first detection unit with the second identification information detected by said second detection unit, and identifying said external device connected with said network AV device by said cable from among said plurality of external devices, and, based on the comparison, causing said network AV device to receive a content from said identified external device by said cable rather than by said network.

2. The network AV device according to claim 1, wherein, if said first identification information matches said second identification information, the network AV device determines that said external device corresponding to the matching second identification information is connected with said network AV device by said cable, and outputs a content to said external device through said cable.

3. An AV network system including a plurality of the network AV devices according to claim 2.

4. The network AV device according to claim 1, wherein, if said first identification information does not match said second identification information, the network AV device determines that said external device corresponding to said first identification information is not connected with said network AV device by said cable, and outputs a content to said external device through said network.

5. The network AV device according to claim 1, further comprising:
    an input unit receiving an instruction from a user;
    a selection unit selecting said one external device from said plurality of external devices in response to the instruction to said input unit; and
    an instruction unit causing said selected external device to transmit said content via said cable if said external device selected by said selection unit is said external device determined by said determination unit as being connected with said network AV device by said cable.

6. The network AV device according to claim 5, further comprising:
    a cable reception unit receiving the content transmitted by said selected external device via said cable; and
    a network reception unit receiving a content transmitted by said selected external device via said network,
    wherein, if said selected external device is said external device determined by said determination unit as being connected with said network AV device by said cable, the network AV device selects said cable reception unit to receive said content.

7. The network AV device according to claim 5, wherein said second detection unit detects said second identification information in response to selection of said external device by said selection unit.

8. The network AV device according to claim 1, further comprising:
    an input unit receiving an instruction from a user;
    a selection unit selecting said one external device from said plurality of external devices in response to the instruction to said input unit; and
    an instruction unit causing said selected external device to transmit said content via said network if said external device selected by said selection unit is said external device determined by said determination unit as not being connected with said network AV device by said cable.

9. The network AV device according to claim 8, further comprising:
    a decoder decoding the content received via said network.

10. The network AV device according to claim 1, further comprising:
    a storage unit storing contents;
    a request reception unit receiving said content request from said external device; and
    a transmission unit transmitting a content corresponding to said content request to said external device that has transmitted said content request via said cable if said external device that has transmitted said content request is said external device determined by said determination unit as being connected with said network AV device by said cable.

11. The network AV device according to claim 10, wherein, if said external device that has transmitted said content request is said external device determined by said determination unit as being connected with said network AV device by said cable, said transmission unit further transmits an instruction to receive the content via said cable and reproduce the received content, to said external device that has transmitted said content request.

12. The network AV device according to claim 10, wherein said second detection unit detects said second identification information in response to reception of said content request by said request reception unit.

13. The network AV device according to claim 1, further comprising:
    a storage unit storing contents;
    a request reception unit receiving a content request from said external device; and
    a transmission unit transmitting said content corresponding to said content request to said external device that has transmitted said content request via said network if said external device that has transmitted said content request is said external device determined by said determination unit as not being connected with said network AV device by said cable.

14. The network AV device according to claim 13, wherein said transmission unit further transmits an instruction to decode said content to said external device that has transmitted said content request.

15. The network AV device according to claim 1, wherein said first detection unit detects data transmitted by said external device after it is activated, and detects said first identification information of said activated external device.

16. The network AV device according to claim 1, wherein said second detection unit senses plugging or unplugging of said cable into or from said external device, and detects said second identification information in response to sensing of plugging or unplugging of said cable.

17. The network AV device according to claim 1, wherein said cable is an HDMI cable.

18. The network AV device according to claim 17, wherein a control signal transferring said second identification information for said cable is a CEC signal.

19. The network AV device according to claim 17, wherein a control signal transferring said second identification information for said cable is an EDID signal.

20. The network AV device according to claim 17, wherein a control signal transferring said second identification information for said cable is a DDC signal.

21. The network AV device according to claim 1, wherein said first identification information and said second identification information are IP addresses.

22. The network AV device according to claim 1, wherein said first identification information and said second identification information are MAC addresses.

23. The network AV device according to claim 1, wherein said first identification information and said second identification information are host names.

24. A network AV device connected with an external device by a network, and connected with an external device by a cable, comprising:

a first detection unit detecting first identification information owned by said external device via said network;
a second detection unit detecting second identification information from said external device via said cable; and
a determination unit comparing the first identification information detected by said first detection unit with the second identification information detected by said second detection unit, determining, if said first identification information matches said second identification, that said external device corresponding to the matching second identification information is connected with said network AV device by said cable, determining, if said first identification information does not match said second identification information, that said external device corresponding to said first identification information is not connected with said network AV device by said cable, and thereby identifying said external device connected with said network AV device by said cable from among said external devices.

25. A network AV device connected with an external device by a network and a cable, comprising:

a first detection unit detecting first identification information owned by said external device via said network;
a second detection unit detecting second identification information from said external device via said cable; and
a comparison unit comparing the first identification information detected by said first detection unit with the second identification information detected by said second detection unit,
wherein, if said first identification information matches said second identification information, the network AV device outputs a content to said external device through said cable, and
if said first identification information does not match said second identification information, the network AV device outputs a content to said external device through said network.

* * * * *